(12) United States Patent
Kantrowitz

(10) Patent No.: US 11,288,747 B2
(45) Date of Patent: Mar. 29, 2022

(54) METHOD, SYSTEM, AND COMPUTER PROGRAM PRODUCT FOR DEVELOPING, EVALUATING, AND VALIDATING INVESTMENT GLIDE PATHS

(71) Applicant: Cerebly, Inc., Skokie, IL (US)

(72) Inventor: Mark Kantrowitz, Skokie, IL (US)

(73) Assignee: Cerebly Inc., Skokie, IL (US)

( * ) Notice: Subject to any disclaimer, the term of this patent is extended or adjusted under 35 U.S.C. 154(b) by 414 days.

(21) Appl. No.: 16/278,431

(22) Filed: Feb. 18, 2019

(65) Prior Publication Data

US 2019/0259102 A1    Aug. 22, 2019

Related U.S. Application Data

(60) Provisional application No. 62/632,111, filed on Feb. 19, 2018.

(51) Int. Cl.
*G06Q 40/06* (2012.01)
*G06F 30/20* (2020.01)

(52) U.S. Cl.
CPC .............. *G06Q 40/06* (2013.01); *G06F 30/20* (2020.01)

(58) Field of Classification Search
CPC ................................. G06Q 40/06; G06F 30/20
USPC ................................................. 705/35, 36 R
See application file for complete search history.

(56) References Cited

U.S. PATENT DOCUMENTS

| | | | | |
|---|---|---|---|---|
| 6,799,167 B1* | 9/2004 | Gullen | .................. | G06Q 40/00 705/35 |
| 8,396,775 B1* | 3/2013 | Mindlin | ................ | G06Q 40/04 705/36 R |
| 2009/0281958 A1* | 11/2009 | Abidi | ..................... | G06Q 40/06 705/36 R |
| 2009/0327155 A1* | 12/2009 | Dial | ........................ | G06Q 40/06 705/36 R |
| 2010/0121779 A1* | 5/2010 | Castineiras | ............ | G06Q 40/02 705/36 R |
| 2014/0279693 A1* | 9/2014 | Roy | ........................ | G06Q 40/06 705/36 R |
| 2016/0063631 A1* | 3/2016 | Wootton | ................ | G06Q 40/06 705/36 R |

(Continued)

OTHER PUBLICATIONS

Dialog NPL (non-patent literature) Search, dated Jan. 1, 2022. (Year: 2022).*

(Continued)

*Primary Examiner* — Hai Tran
(74) *Attorney, Agent, or Firm* — The Webb Law Firm

(57) ABSTRACT

A method for developing, evaluating, and validating investment glide paths for an investment event having an expected first duration includes: generating, with at least one processor, execution logic associated with at least one delayed onset investment glide path associated with the investment event and having the first duration, the at least one delayed onset investment glide path including: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and automatically initiating, with at least one processor, execution of the at least one delayed onset investment glide path according to the execution logic.

18 Claims, 11 Drawing Sheets

(56) References Cited

U.S. PATENT DOCUMENTS

2016/0232614 A1* 8/2016 Vorwerk ................ G06Q 40/06

OTHER PUBLICATIONS

Google Scholar NPL (non-patent literature) Search, dated Jan. 1, 2022. (Year: 2022).*
Google NPL (non-patent literature) Search, dated Jan. 1, 2022. (Year: 2022).*
American Funds, "American Funds College Target Date Series®", https://www.americanfunds.com/individual/products/target-date-college-series.html.

* cited by examiner

METHOD, SYSTEM, AND COMPUTER PROGRAM PRODUCT FOR DEVELOPING, EVALUATING, AND VALIDATING INVESTMENT GLIDE PATHS

CROSS REFERENCE TO RELATED APPLICATIONS

This application claims priority to U.S. Provisional Application No. 62/632,111 filed Feb. 19, 2018, the disclosure of which is hereby incorporated by reference in its entirety.

BACKGROUND

Field

The disclosure relates to a method, system, and computer program product for developing, evaluating, and validating investment glide paths for an investment event having an expected first duration.

Technical Considerations

Over extended time periods, the stock market can be expected to experience numerous corrections (drops of at least 10%) and/or bear markets (drops of at least 20%). For example, during a 17-year period expected to be associated with an investment event for college savings (e.g., a 529 Plan), the stock market typically suffers at least three corrections and one bear market. Risk is therefore unavoidable during the course most investment events.

An investment glide path includes logic that specifies how the percentage of the investment portfolio associated with an investment event changes in each asset class over time. To maximize the return while simultaneously minimizing the risk associated with an investment event, certain strategies involve using an age-based asset allocation, which starts with an aggressive mix of investments and shifts to a more conservative mix of investments as the investment event approaches completion. These strategies involve using a shift in the age-based asset allocation from start to finish without delay.

However, existing systems utilizing age-based asset allocation strategies fail to consider utilizing a delayed onset investment glide path, which incorporates a reallocation glide path following an initial fixed allocation glide path. Further, existing systems fail to consider historical investment data to generate and simulate delayed onset investment glide paths and to generate execution logic associated with these delayed onset investment glide paths.

SUMMARY

Accordingly, and generally, provided is an improved method, system, and computer program product for developing, evaluating, and validating investment glide paths for an investment event having an expected first duration.

According to some non-limiting embodiments or aspects, a method for developing, evaluating, and validating investment glide paths for an investment event having an expected first duration, includes: generating, with at least one processor, execution logic associated with at least one delayed onset investment glide path associated with the investment event and having the first duration, the at least one delayed onset investment glide path including: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and automatically initiating, with at least one processor, execution of the at least one delayed onset investment glide path according to the execution logic.

In some non-limiting embodiments or aspects, the method may further include: receiving, with at least one processor, historical investment data associated with a plurality of consecutive time periods, where the plurality of consecutive time periods sum to a second duration at least as long as the first duration; generating, with at least one processor, a plurality of delayed onset investment glide paths associated with the investment event and having the first duration; and simulating, with at least one processor, projected returns over the first duration for each of the plurality of delayed onset investment glide paths based on the historical investment data associated with a plurality of the consecutive time periods summing to a length equal to the first duration. The method may further include automatically initiating, with at least one processor, execution of the at least one of the plurality of delayed onset investment glide paths according to the execution logic. The second duration may be longer than the first duration, and simulating the projected returns for each of the plurality of delayed onset investment glide paths may include: determining, with at least one processor, a plurality of different simulation periods, each simulation period having a plurality of the consecutive time periods summing to a length equal to the first duration; and for each of the simulation periods, simulating, with at least one processor, projected returns for each of the plurality of delayed onset investment glide paths using the historical investment data associated with the respective simulation period.

In some non-limiting embodiments or aspects, the reallocation glide path may include a compression rate defined by a duration between reallocation events associated with the reallocation glide path, and the method may further include: generating, with at least one processor, a plurality of compression rates associated with the reallocation glide path; simulating, with at least one processor, projected returns over the reallocation glide path for each of the plurality of compression rates associated with the reallocation glide path based on historical investment data; and based on the simulated projected returns, configuring, with at least one processor, execution logic representing at least one of the plurality of compression rates associated with the reallocation glide path. The investment event may include a K-12 savings account, a college savings account, a retirement savings account, or a down payment savings account. The compression rate may include between one reallocation event per month and one reallocation event per year. The extended fixed allocation glide path may include at least 1 year. The reallocation event may include initiating a percentage change in asset class allocation in an account associated with the investment event.

In some non-limiting embodiments or aspects, the method may further include determining a risk associated with each of the plurality of delayed onset investment glide paths based on the simulated projected returns. Determining the risk associated with each of the plurality of delayed onset investment glide paths may include analyzing a percentage of the simulated projected returns falling below a threshold, and the threshold may include a return on investment for a baseline glide path. An initial asset allocation associated with the extended fixed allocation glide path may include at least 75% high-risk investments. The at least one delayed onset investment glide path may include non-linear portion.

According to some non-limiting embodiments or aspects, a system for developing, evaluating, and validating investment glide paths for an investment event having an expected first duration, includes at least one processor programmed or configured to: generate execution logic associated with at least one delayed onset investment glide path associated with the investment event and having the first duration, the at least one delayed onset investment glide path including: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and automatically initiate execution of the at least one delayed onset investment glide path according to the execution logic.

In some non-limiting embodiments or aspects, the at least one processor may be further programmed or configured to: receive historical investment data associated with a plurality of consecutive time periods, where the plurality of consecutive time periods sum to a second duration at least as long as the first duration; generate a plurality of delayed onset investment glide paths associated with the investment event and having the first duration; and simulate projected returns over the first duration for each of the plurality of delayed onset investment glide paths based on the historical investment data associated with a plurality of the consecutive time periods summing to a length equal to the first duration. The investment event may include a K-12 savings account, a college savings account, a retirement savings account, or a down payment savings account.

In some non-limiting embodiments or aspects, the second duration may be longer than the first duration, and simulating the projected returns for each of the plurality of delayed onset investment glide paths may include the at least one processor: determining a plurality of different simulation periods, each simulation period having a plurality of the consecutive time periods summing to a length equal to the first duration; and for each of the simulation periods, simulating projected returns for each of the plurality of delayed onset investment glide paths using the historical investment data associated with the respective simulation period. The reallocation glide path may include a compression rate defined by a duration between reallocation events associated with the reallocation glide path, where the at least one processor may be further programmed or configured to: generate a plurality of compression rates associated with the reallocation glide path; simulate projected returns over the reallocation glide path for each of the plurality of compression rates associated with the reallocation glide path based on historical investment data; and based on the simulated projected returns, generate execution logic representing at least one of the plurality of compression rates associated with the reallocation glide path. The extended fixed allocation glide path may include at least 1 year.

According to some non-limiting embodiments or aspects, a method for developing, evaluating, and validating investment glide paths for an investment event having an expected first duration includes: generating, with at least one processor, execution logic associated with at least one extended delay embedded investment glide path associated with the investment event and having the first duration, the at least one extended delay embedded investment glide path including: a reallocation glide path including a plurality of reallocation events, where the reallocation glide path includes an extended fixed section between a first allocation event and a last reallocation event, the extended fixed section having a duration longer than an average duration of remaining fixed sections; and automatically initiating, with at least one processor, execution of the at least one extended delay embedded investment glide path according to the execution logic.

In some non-limiting embodiments or aspects, the method may further include: receiving, with at least one processor, historical investment data associated with a plurality of consecutive time periods, where the plurality of consecutive time periods sum to a second duration at least as long as the first duration; generating, with at least one processor, a plurality of extended delay embedded investment glide paths associated with the investment event and having the first duration; and simulating, with at least one processor, projected returns over the first duration for each of the plurality extended delay embedded investment glide paths based on the historical investment data associated with a plurality of the consecutive time periods summing to a length equal to the first duration.

Further embodiments or aspects are set forth in the following numbered clauses:

Clause 1: A method for developing, evaluating, and validating investment glide paths for an investment event having an expected first duration, comprising: generating, with at least one processor, execution logic associated with at least one delayed onset investment glide path associated with the investment event and having the first duration, the at least one delayed onset investment glide path comprising: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and automatically initiating, with at least one processor, execution of the at least one delayed onset investment glide path according to the execution logic.

Clause 2: The method of clause 1, further comprising: receiving, with at least one processor, historical investment data associated with a plurality of consecutive time periods, wherein the plurality of consecutive time periods sum to a second duration at least as long as the first duration; generating, with at least one processor, a plurality of delayed onset investment glide paths associated with the investment event and having the first duration; and simulating, with at least one processor, projected returns over the first duration for each of the plurality of delayed onset investment glide paths based on the historical investment data associated with a plurality of the consecutive time periods summing to a length equal to the first duration.

Clause 3: The method of clause 2, wherein the second duration is longer than the first duration, wherein simulating the projected returns for each of the plurality of delayed onset investment glide paths comprises: determining, with at least one processor, a plurality of different simulation periods, each simulation period having a plurality of the consecutive time periods summing to a length equal to the first duration; and for each of the simulation periods, simulating, with at least one processor, projected returns for each of the plurality of delayed onset investment glide paths using the historical investment data associated with the respective simulation period.

Clause 4: The method of any of clauses 1-3, wherein the reallocation glide path comprises a compression rate defined by a duration between reallocation events associated with the reallocation glide path, wherein the method further comprises: generating, with at least one processor, a plurality of compression rates associated with the reallocation glide path; simulating, with at least one processor, projected returns over the reallocation glide path for each of the plurality of compression rates associated with the reallocation glide path based on historical investment data; and based on the simulated projected returns, configuring, with at least one processor, execution logic representing at least one of the plurality of compression rates associated with the reallocation glide path.

Clause 5: The method of any of clauses 1-4, wherein the investment event comprises a K-12 savings account, a college savings account, a retirement savings account, or a down payment savings account.

Clause 6: The method of clause 4 or 5, wherein the compression rate comprises between one reallocation event per month and one reallocation event per year.

Clause 7: The method of any of clauses 1-6, wherein the extended fixed allocation glide path comprises at least 1 year.

Clause 8: The method of any of clauses 4-7, wherein the reallocation event comprises initiating a percentage change in asset class allocation in an account associated with the investment event.

Clause 9: The method of any of clauses 2-8, further comprising: determining a risk associated with each of the plurality of delayed onset investment glide paths based on the simulated projected returns.

Clause 10: The method of clause 9, wherein determining the risk associated with each of the plurality of delayed onset investment glide paths comprises analyzing a percentage of the simulated projected returns falling below a threshold, wherein the threshold comprises a return on investment for a baseline glide path.

Clause 11: The method of any of clauses 1-10, wherein an initial asset allocation associated with the extended fixed allocation glide path comprises at least 75% high-risk investments.

Clause 12: The method of any of clauses 1-11, wherein the at least one delayed onset investment glide path comprises a non-linear portion.

Clause 13: A system for developing, evaluating, and validating investment glide paths for an investment event having an expected first duration, comprising at least one processor programmed or configured to: generate execution logic associated with at least one delayed onset investment glide path associated with the investment event and having the first duration, the at least one delayed onset investment glide path comprising: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and automatically initiate execution of the at least one delayed onset investment glide path according to the execution logic.

Clause 14: The system of clause 13, wherein the at least one processor is further programmed or configured to: receive historical investment data associated with a plurality of consecutive time periods, wherein the plurality of consecutive time periods sum to a second duration at least as long as the first duration; generate a plurality of delayed onset investment glide paths associated with the investment event and having the first duration; and simulate projected returns over the first duration for each of the plurality of delayed onset investment glide paths based on the historical investment data associated with a plurality of the consecutive time periods summing to a length equal to the first duration.

Clause 15: The system of clause 13 or 14, wherein the investment event comprises a K-12 savings account, a college savings account, a retirement savings account, or a down payment savings account.

Clause 16: The system of clause 14 or 15, wherein the second duration is longer than the first duration, wherein simulating the projected returns for each of the plurality of delayed onset investment glide paths comprises the at least one processor comprises: determining a plurality of different simulation periods, each simulation period having a plurality of the consecutive time periods summing to a length equal to the first duration; and for each of the simulation periods, simulating projected returns for each of the plurality of delayed onset investment glide paths using the historical investment data associated with the respective simulation period.

Clause 17: The system of any of clauses 13-16, wherein the reallocation glide path comprises a compression rate defined by a duration between reallocation events associated with the reallocation glide path, wherein the at least one processor is further programmed or configured to: generate a plurality of compression rates associated with the reallocation glide path; simulate projected returns over the reallocation glide path for each of the plurality of compression rates associated with the reallocation glide path based on historical investment data; and based on the simulated projected returns, generate execution logic representing at least one of the plurality of compression rates associated with the reallocation glide path.

Clause 18: The system of any of clauses 13-17, wherein the extended fixed allocation glide path comprises at least 1 year.

Clause 19: A computer program product for developing, evaluating, and validating investment glide paths for an investment event having an expected first duration, the computer program product comprising at least one non-transitory computer-readable medium including one or more instructions that, when executed by at least one processor, cause the at least one processor to: generate execution logic associated with at least one delayed onset investment glide path associated with the investment event and having the first duration, the at least one delayed onset investment glide path comprising: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and automatically initiate execution of the at least one delayed onset investment glide path according to the execution logic.

Clause 20: The computer program product of clause 19, wherein the one or more instructions, when executed by at least one processor, further cause the at least one processor to: receive historical investment data associated with a plurality of consecutive time periods, wherein the plurality of consecutive time periods sum to a second duration at least as long as the first duration; generate a plurality of delayed onset investment glide paths associated with the investment event and having the first duration; and simulate projected returns over the first duration for each of the plurality of delayed onset investment glide paths based on the historical investment data associated with a plurality of the consecutive time periods summing to a length equal to the first duration.

Clause 21: A method for developing, evaluating, and validating investment glide paths for an investment event having an expected first duration, comprising: generating, with at least one processor, execution logic associated with at least one extended delay embedded investment glide path associated with the investment event and having the first duration, the at least one extended delay embedded investment glide path comprising: a reallocation glide path comprising a plurality of reallocation events, wherein the reallocation glide path comprises an extended fixed section between a first allocation event and a last reallocation event, the extended fixed section having a duration longer than an average duration of remaining fixed sections; and automatically initiating, with at least one processor, execution of the at least one extended delay embedded investment glide path according to the execution logic.

Clause 22: The method of clause 21, further comprising: receiving, with at least one processor, historical investment data associated with a plurality of consecutive time periods, wherein the plurality of consecutive time periods sum to a second duration at least as long as the first duration; generating, with at least one processor, a plurality of extended delay embedded investment glide paths associated with the investment event and having the first duration; and simulating, with at least one processor, projected returns over the first duration for each of the plurality extended delay embedded investment glide paths based on the historical investment data associated with a plurality of the consecutive time periods summing to a length equal to the first duration.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
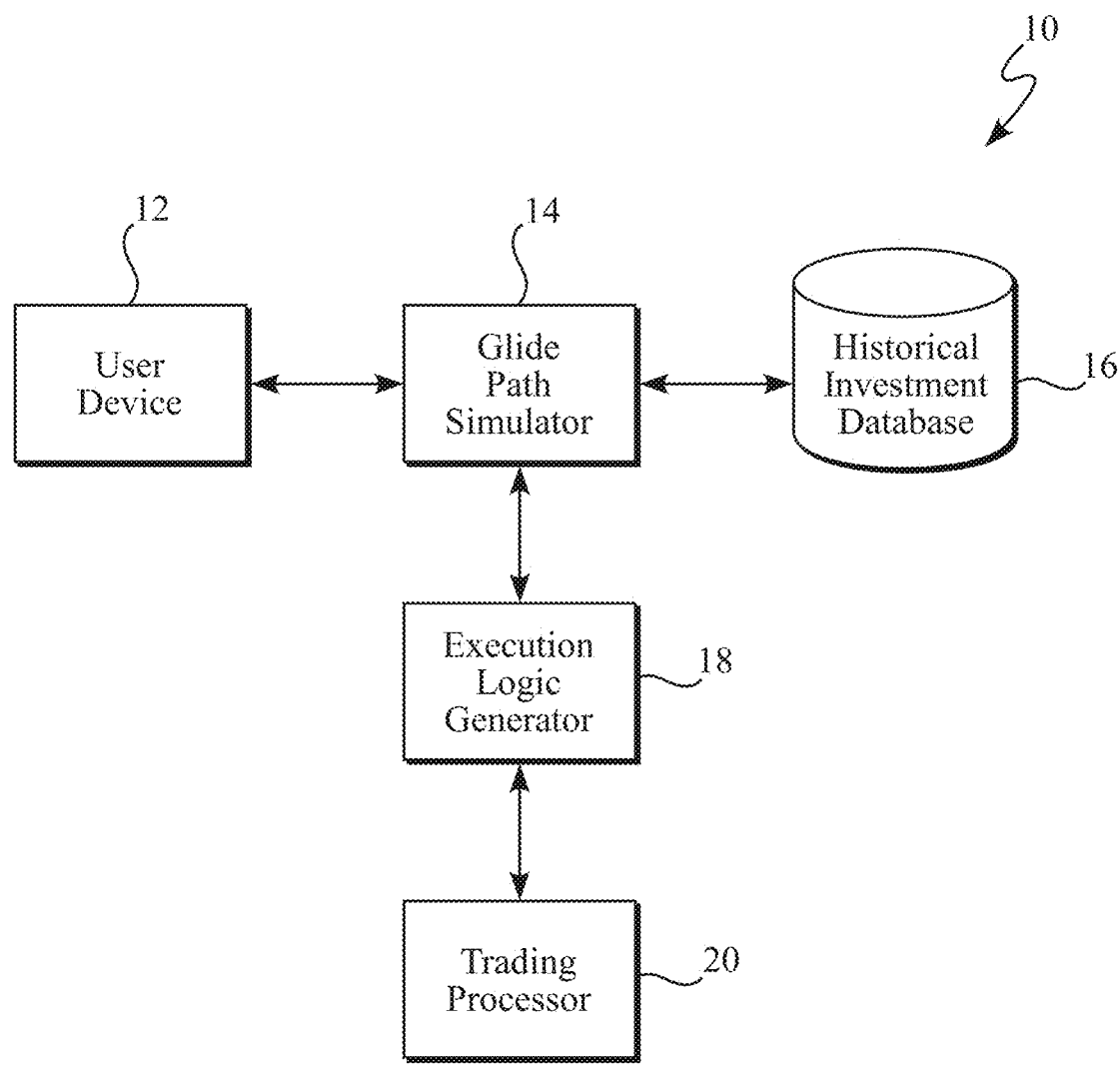
FIG. 1 shows a schematic view of some non-limiting embodiments or aspects of a system for developing, evaluating, and validating investment glide paths for an investment event having an expected first duration.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" may refer to one or more electronic devices capable of processing data. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. In other non-limiting embodiments, the computing device may be a desktop computer, kiosk, or other non-mobile computer. Furthermore, the terms "computer" or "computing device" may refer to any device that includes the necessary components to receive, process, and output data, and normally includes a display, a processor, a memory, an input device, and a network interface.

Non-limiting embodiments or aspects of the present disclosure are directed to a method, system, and computer program product for developing, evaluating, and validating investment glide paths for an investment event having an expected first duration. Non-limiting embodiments or aspects generate execution logic associated with at least one delayed onset investment glide path and provide for automatically initiating execution of the at least one delayed onset investment glide path according to the generated execution logic. Non-limiting embodiments or aspects utilize historical investment data to simulate a plurality of delayed onset investment glide paths. This allows for the various potential delayed onset investment glide paths to be analyzed and compared to determine delayed onset investment glide paths expected to have the best performance. Non-limiting embodiments or aspects also simulate projected returns of various compression rates using historical investment data to determine which compression rates are expected to yield the best performance. Execution logic is generated to represent at least one of the compression rates associated with the reallocation glide path section of the delayed onset investment glide path.

Referring to FIG. 1, a system 10 for developing, evaluating, and validating investment glide paths for an investment event having an expected first duration is shown. The system 10 may include a user device 12 in communication with a glide path simulator 14. The user device 12 may be a computing device, such as the smart phone, tablet computer, laptop computer, desktop computer, and the like of the user. The glide path simulator 14 may be in communication with a historical investment database 16, which stores historical investment data. The glide path simulator 14 may be in communication with an execution logic generator 18. The execution logic generator 18 may be in communication with a trading processor 20. The glide path simulator 14, the execution logic generator 18, and/or the trading processor 20 may include a computing device and/or software executing on a computing device, such as an application executed by a server computer. It will be appreciated that the glide path simulator 14, the execution logic generator 18, and/or the trading processor 20 may be the same processor or separate processors.

As used herein, "investment glide path" refers to an algorithm specifying the percentage of an investment portfolio of an investment account invested in each asset class and how that asset allocation changes over time during the investment event and defined by execution logic.

As used herein, "investment event" refers to a user investment account and associated temporal goal opened in order to save for a particular purpose. For example, the investment event may include a K-12 savings, with the purpose of saving for tuition for a K-12 education; a college savings account (e.g., a 529 account), with the purpose of saving for a college or other higher education; a retirement savings account (e.g., an IRA, a 401(k), etc.), with the purpose of saving for retirement, a down payment savings account, with the purpose of saving for real estate, a car, or other monetarily significant purchase; and other various savings accounts.

The investment event may have an expected first duration. As used herein, "first duration" refers to a time period over which the investment event is expected to occur. As a non-limiting example, for an investment event that is a college savings account opened at the time of a child's birth, the investment event may be expected to have a first duration of until the child enrolls in college (e.g., approximately 17 years). As another non-limiting example, for an investment event that is a retirement savings account, the first duration may be expected to have a first duration of the difference between the current age of the user and the user's expected retirement age (e.g., typically at least 65 years old). It will be appreciated that the first duration may be different for different users that have the same investment event.

With continued reference to FIG. 1, the user device 12 may communicate a request message to the glide path simulator 14, which is configured to cause the glide path simulator 14, along with the execution logic generator 18 and/or the trading processor 20 to develop, evaluate, and validate investment glide paths for an investment event. The request may include a request to initiate an investment event (e.g., request to open a particular type of account), along with specifics about the investment event, such as type of investment event, expected first duration, investment preferences (e.g., risk aversions), and investment goals. The request may be a request to determine potential glide paths expected to have the best performance for a particular first duration. Such a request may be communicated before a request to initiate an investment event or after an investment event is on-going to re-evaluate the current investment glide path.

The glide path simulator 14 may communicate with the historical investment database 16 to receive historical investment data associated with a plurality of consecutive time periods, the sum of which sum to a second duration at least as long as the first duration. For example, for a college savings account having a first duration of 17 years, the second duration may be at least 17 years, such that at least 17 years of consecutive historical investment data is received by the glide path simulator 14. The glide path simulator 14 receiving the historical investment data from the historical investment database 16 may include the glide path simulator 14 passively receiving the historical investment data or actively retrieving the historical investment data from the historical investment database 16.

The historical investment data may include any type of data that can be used in an algorithm for determining performance of an investment glide path. The historical investment data may include historical data associated with individual assets or classes of assets (e.g., real estate, stocks, bonds, cash, CDs, mutual funds, money market accounts etc.); subclasses of assets (e.g., small, mid, and large-cap stock; domestic and foreign stock; growth and value stock; low, medium, and high risk investments; and the like); groups of assets (e.g., S&P 500, Dow Jones, Russell 2000, and the like); or some combination thereof. The historical investment data may include daily prices, max price, min price, dividends, ROI, P/E ratio, P/B ratio, number of shares, earnings, and the like. Averages, medians, modes, standard deviations, and the like of this data may be included in the historical investment data.

With continued reference to FIG. 1, in response to receiving the historical investment data, the glide path simulator 14 may generate a plurality of delayed onset investment glide paths. As used herein, a "delayed onset investment glide path" refers to an investment glide path that includes (1) an extended fixed allocation glide path at the beginning of the first duration of the investment glide path and (2) a reallocation glide path immediately following the extended fixed allocation glide path, which continues for the remainder of the first duration, wherein the duration of the extended fixed allocation glide path is longer than the average duration between reallocation events of the reallocation glide path (the average length of the remaining fixed sections of the remainder of the investment glide path). The extended fixed allocation glide path includes a fixed asset allocation, where the investment assets are not changed from the beginning of the investment event to the start of the reallocation glide path. During the reallocation glide path, which is defined as commencing at the time of the first shift in asset allocation, the assets may be additionally reallocated periodically for the duration of the investment event.

With respect to the extended fixed allocation glide path of the generated delayed onset investment glide paths, the extended fixed allocation glide path may include an initial asset allocation comprising at least 75% high risk investments, such as at least 80%, at least 85%, or at least 90%. As used herein, high risk investments include: stocks, stock mutual funds, stock index funds, exchange-traded funds, real estate, REITs, domestic stocks, and foreign stocks. As used herein, medium risk investments include a blend between high risk and low risk investments. As used herein, low risk investments include: bonds, short-term bonds, cash, CDs, money market accounts, and US Treasuries. The extended fixed allocation glide path may have a duration of at least 1 year, such as at least 2 years, at least 3 years, at least 4 years, at least 5 years, at least 6 years, at least 7 years, at least 8 years, at least 9 years, or at least 10 years.

With respect to the reallocation glide path of the generated delayed onset investment glide paths, the reallocation glide path may include at least one reallocation event. As used herein, "reallocation event" refers to a percentage change in asset allocations in the investment account associated with the investment event. The reallocation glide path may include a plurality of reallocation events. For reallocation glide paths including a plurality of reallocation events, the reallocation glide path may include a compression rate. As used herein, "compression rate" refers to a duration between reallocation events of the reallocation glide path. The reallocation glide path may have multiple compression rates depending on the duration between reallocation events. In some non-limiting embodiments or aspects, the reallocation glide path may include a compression rate of from 1 reallocation event per month to 1 reallocation event per year. In some non-limiting embodiments, the reallocation glide path may include a compression rate of 1 reallocation event per 2 years, per 3 years, per 4 years, or per 5 years. In some non-limiting embodiments, the reallocation glide path may be, at least in part, non-linear, such that the delayed onset investment glide path includes a non-linear portion.

The glide path simulator 14 may also generate non-delayed onset investment glide paths.

With continued reference to FIG. 1, the glide path simulator 14 may simulate projected returns over the first duration for each of the generated plurality of delayed onset investment glide paths. The simulated projected returns may be based on the delayed onset investment glide path itself and the historical investment data associated with a plurality of consecutive time periods that sum to a length equal to the first duration. This plurality of consecutive time periods may be a subset of the plurality of consecutive time periods of the second duration, which is equal to in length or longer to the first duration.

Simulating the projected returns for each delayed onset investment glide path may include determining a plurality of different simulation periods from the second duration, each simulation period having a plurality of consecutive time periods summing to a length equal to the first duration. As an illustrative, non-limiting example of determining a plurality of different simulation periods, consider an investment event being a college savings account having an expected first duration of 17 years. Further consider the historical investment data having data from 1950-2017 (a second duration of 67 years). The plurality of simulation periods may all span different consecutive 17-year sections of the second duration, such as one simulation period from Jan. 1, 1950 to Jan. 1, 1967, a second simulation period from Jan. 1, 1951 to Jan. 1, 1968, etc. Thus, the second duration may include myriad first-duration-length 17-year periods.

For each of the determined simulation period, the glide path simulator 14 may simulate projected returns for the plurality of delayed onset investment glide paths using the historical investment data for the respective simulation period.

With continued reference to FIG. 1, the glide path simulator 14 may determine a risk associated with each of the generated and simulated delayed onset investment glide paths. The risk may be determined based on the simulated projected return(s) associated with each of the delayed onset investment glide paths. Determining the risk associated with each delayed onset investment glide path may include the glide path simulator 14 analyzing a percentage of simulated projected returns falling below a threshold. The threshold may include a baseline glide path for the same simulation period. The ROI (or any other factor, such as average earnings) for the simulated delayed onset investment glide path may be analyzed against the ROI (or any other factor, such as average earnings) of the baseline glide path for the same simulation period. The baseline glide path having a safe level of 0% asset allocation in stocks.

The glide path simulator 14 may generate a plurality of compression rates associated with the reallocation glide path of the delayed onset investment glide paths (having the same extended fixed allocation glide paths). The glide path simulator 14 may simulate projected returns over the reallocation glide path for each of the plurality of generated compression rates associated with the reallocation glide paths based on the historical investment data, in a manner similar to the above-described simulation of the delayed onset investment glide paths as a whole.

With continued reference to FIG. 1, the glide path simulator 14 may communicate the simulated projected returns for the plurality of delayed onset investment glide paths and/or the plurality of compression rates to the execution logic generator 18. The execution logic generator 18 may generate execution logic associated with at least one of the delayed onset investment glide paths. Execution logic may also be generated for at least one of the plurality of simulated compression rates associated with the reallocation glide paths. The execution logic may be generated for all of the delayed onset investment glide paths or for some subset thereof (e.g., the delayed investment glide path(s) determined to have the highest performance). In some non-limiting embodiments, based on the simulated delayed onset investment glide paths, the user device may select the desired delayed onset investment glide path (or adjustment to an existing delayed onset investment glide path), and the execution logic generator 18 may generate the execution logic for at least the selected delayed onset investment glide path.

Generating the execution logic may include configuring the execution logic, such that the execution logic is formatted to be executed, such as by the trading processor 20. The execution logic may include a data file containing information associated with the delayed onset investment glide path(s). The execution logic may include program instructions for executing the delayed onset investment glide paths, including initiating the extended fixed allocation glide path (e.g., the initial asset allocation) associated therewith and initiating the reallocation glide path immediately following, including the reallocation events associated therewith. The execution logic may include a message to be communicated to the trading processor 20 to cause the trading processor to execute the delayed onset investment glide path.

With continued reference to FIG. 1, the execution logic generator 18 may automatically initiate execution of the delayed onset investment glide path by communicating the generated execution logic to the trading processor 20. The trading processor 20 may automatically initiate execution of the at least one delayed onset investment glide path according to the execution logic. This may include executing the initial buys, sells, and trades associated with obtaining for the investment account of the investment event the asset allocation specified in the execution logic for the delayed onset investment glide path. This may further include automatically initiating and executing the subsequent reallocation events specified in the execution logic for the delayed onset investment glide path.

The above described system 10 for developing, evaluating, and validating investment glide paths for an investment event having an expected first duration may be used to generate the execution logic for the delayed onset investment glide path at the initiation of the investment event, such as to initiate opening an account associated with the investment account and executing the delayed onset investment glide path. However, the system 10 may be further used to generate execution logic to update a delayed onset investment glide path currently being executed. For example, a user may revisit the initially selected and executed delayed onset investment glide path based on updated historical investment data. The generated execution logic in this non-limiting example may include execution logic to update the existing delayed onset investment glide path to the newly selected delayed onset investment glide path (e.g., adjusting the asset allocation and altering the dates of the reallocation events and the asset allocations associated therewith).

Figure 2:
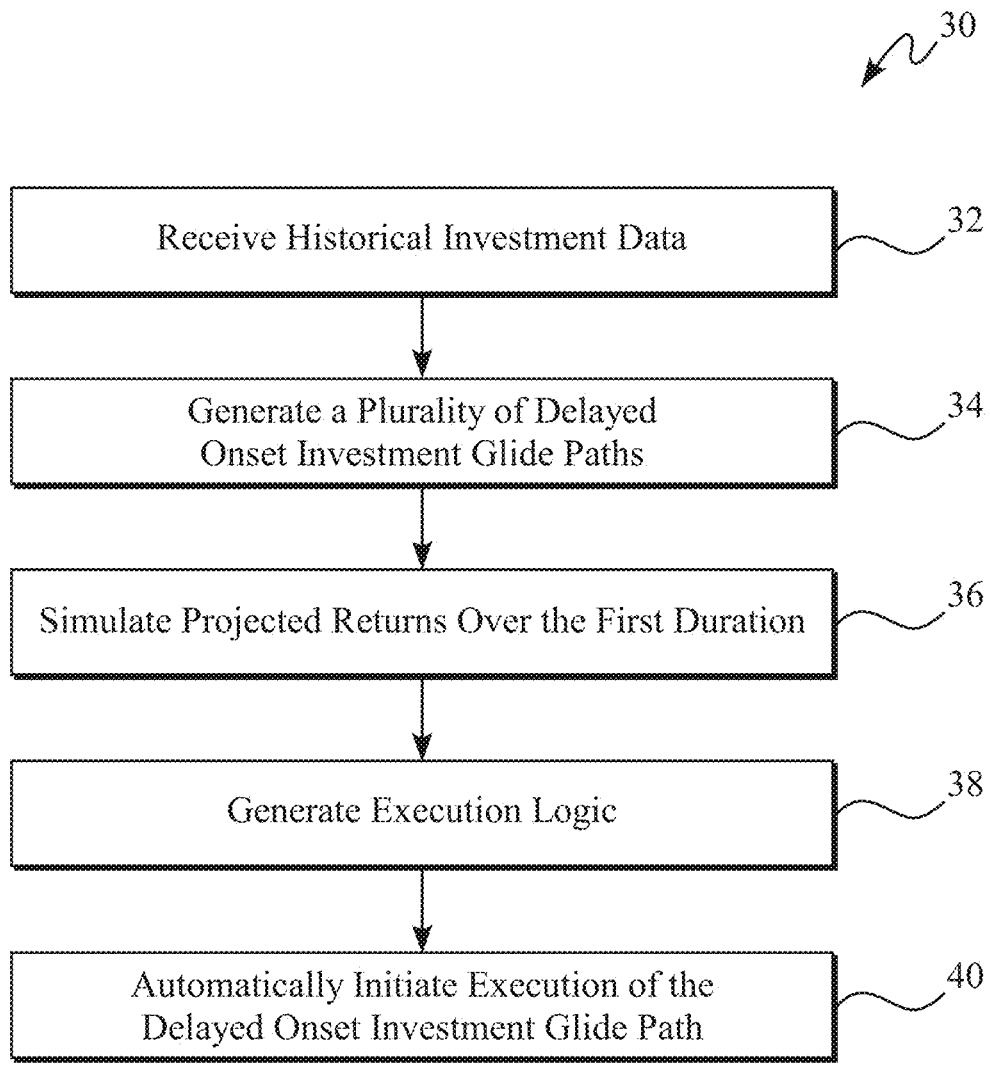
FIG. 2 shows a schematic view of some non-limiting embodiments or aspects of a method for developing, evaluating, and validating investment glide paths for an investment event having an expected first duration.

Referring to FIG. 2, a method 30 for developing, evaluating, and validating investment glide paths for an investment event having an expected first duration is shown. At a first step 32, the glide path simulator 14 may receive historical investment data from the historical investment database 16, the historical investment data associated with a plurality of consecutive time periods, where the plurality of consecutive time periods sum to a second duration at least as long as the first duration. At a second step 34, the glide path simulator 14 may generate a plurality of delayed onset investment glide paths associated with the investment event and having the first duration. At a third step 36, the glide path simulator 14 may simulate projected returns over the first duration for each of the plurality of delayed onset investment glide paths based on the historical investment data associated with a plurality of the consecutive time periods summing to a length equal to the first duration.

At a fourth step 38, the glide path simulator 14 may communicate the simulated projected returns to the execution logic generator 18, and the execution logic generator 18 may generate execution logic associated with at least one delayed onset investment glide path associated with the investment event and having the first duration. At a fifth step 40, the execution logic generator 18 may automatically initiate execution of the at least one delayed onset investment glide path according to the execution logic, such as by communicating the execution logic to the trading processor 20.

In a further, non-limiting embodiment, a computer program product for developing, evaluating, and validating investment glide paths for an investment event having an expected first duration includes at least one non-transitory computer readable medium including program instructions that, when executed by at least one processor, cause the at least one processor to execute one of the previously-described systems and/or methods. The at least one processor may include the glide path simulator 14, the execution logic generator 18, and/or the trading processor 20.

EXAMPLES

Non-Delayed Onset Investment Glide Paths

Figure 3:
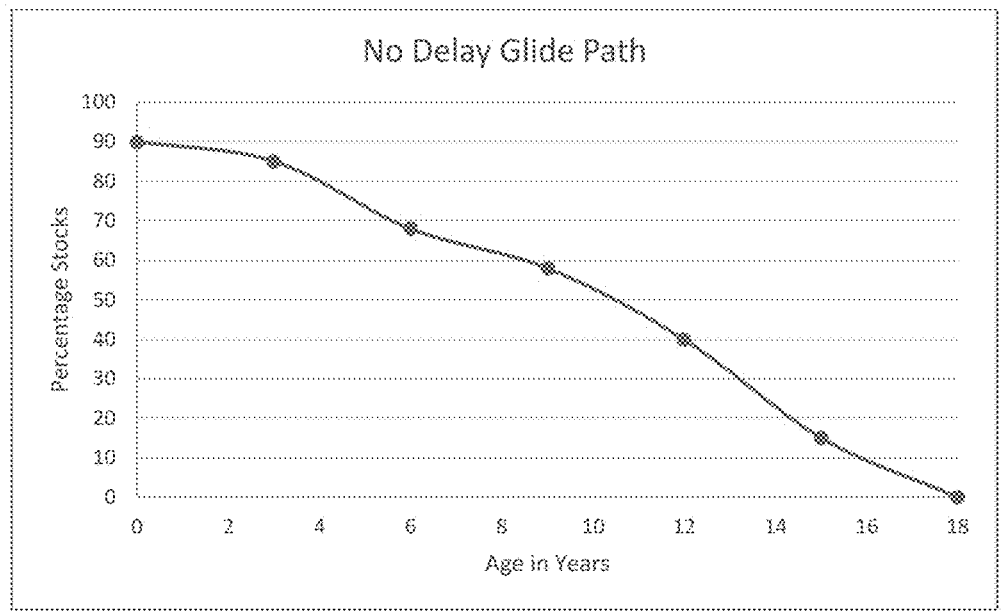
FIG. 3 shows a graph of an exemplary investment glide path having no delayed onset.

Referring to FIG. 3, a graph shows the percentage of stocks over the course of an 18 year investment event for an exemplary investment glide path that is a non-delayed onset investment glide path, as the duration of the fixed section at the start of the investment glide path is less than or equal to the average duration between reallocation events for the remainder of the investment glide path (the average length of the remaining fixed sections of the remainder of the investment glide path) Existing commercial investment glide path for college savings account do not employ delayed onset investment glide paths.

Historical Investment Data

Figure 4:
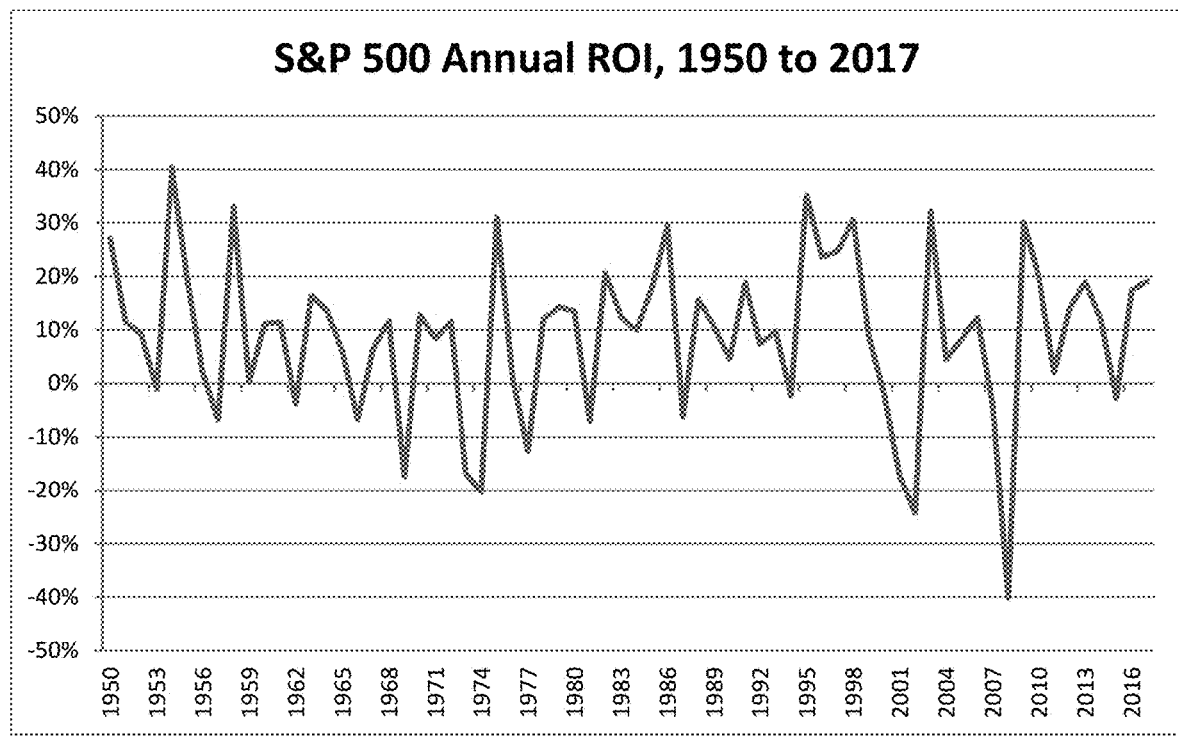
FIG. 4 shows a graph of S&P 500 annual return on investment (ROI) data from 1950 to 2017 as a non-limiting example of historical investment data.
Figure 5:
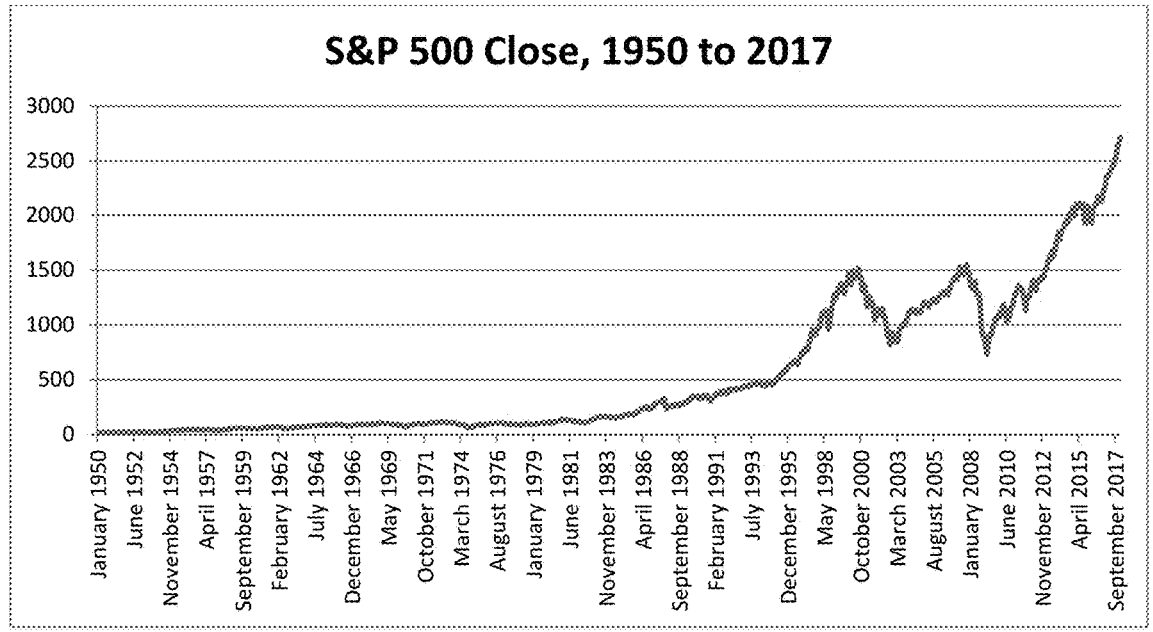
FIG. 5 shows a graph of shows a graph of S&P 500 close data from 1950 to 2017 as a non-limiting example of historical investment data.

Referring to FIGS. 4 and 5, non-limiting examples of historical investment data are shown. The historical investment data in FIG. 4 shows the annual ROI for the S&P 500 from 1950-2017 (e.g., a second duration), which ranged from a maximum loss of 40.1% to a maximum gain of 40.5%, with an average ROI of 8.9%. FIG. 5 shows the monthly closing price of the S&P 500 from 1950 to 2017, showing bear markets that ended in 2002 and 2009. These examples of historical investment data are non-limiting examples of historical investment data that may be used to simulate projected returns for various delayed onset investment glide paths.

Over the time period of January 1950 to December 2017 there are six hundred 204-month (17-year) periods, identical in length to the expected first duration of a college savings account. These six hundred 204-month periods may each be simulated for any type of 204-month investment glide path. Total savings for an investment glide path for a 204-month period can be represented by the following equation:

$$\sum_{m=1}^{204} \left( C_{m+n} \times \prod_{i=m}^{204} (1 + GP_i \times HighRiskROI_{n+i} + (1 - GP_i) \times LowRiskROI_{n+i}) \right)$$

where $GP_i$ is the percentage of high risk investments at month i in the glide path, C is the monthly contribution and n is the date of the start month.

This past performance data for each delayed onset investment glide path may provide insight into typical performance of the various delayed onset investment glide paths.

Level Asset Allocation

A level asset allocation uses a flat investment glide path that sets a fixed percentage of the investment portfolio that is invested in stocks for all 17 years of the college savings account investment event Table 1 shows the ROI for various level asset allocation strategies assuming a $250 monthly contribution ($51,000) for all 17-year periods from 1950 to 2017. As the table demonstrates, the average earnings for a Level 100% investment glide path are $50,790, almost the same as the total contributions. This corresponds to having 42.5% of the total savings come from earnings. It is the equivalent of having a no-risk, fixed annual ROI of 6.0%. Table 1 also shows that the no-risk strategy of having none of the money invested in stocks (Level 0%) yields average earnings of $4,567, with 8.2% of the total savings coming from earnings. That is a useful baseline performance for comparison with the other investment glide paths.

TABLE 1

| Asset Allocation | Min | Max | Average | Standard Deviation | Equivalent Fixed Annual ROI | Average Earnings |
|---|---|---|---|---|---|---|
| Level 100% | −18.9% | 77.3% | 42.5% | 20.1% | 6.0% | $50,790 |
| Level 80% | −11.7% | 69.9% | 38.1% | 17.3% | 5.2% | $38,708 |
| Level 75% | −10.1% | 67.7% | 36.8% | 16.5% | 5.0% | $35,948 |
| Level 50% | −2.9% | 54.1% | 29.4% | 12.2% | 3.8% | $23,549 |
| Level 25% | 3.2% | 34.9% | 20.0% | 6.9% | 2.5% | $13,204 |
| Level 20% | 4.3% | 30.2% | 17.8% | 5.6% | 2.2% | $11,350 |
| Level 0% | 8.2% | 8.2% | 8.2% | 0.0% | 0.9% | $4,567 |

Investing 100% in stocks for the entire 17-year period comes with some risks, as shown in Table 2. The risk associated with investment glide paths may be approximated by reporting the percentage of 204-month periods (17-year periods) from 1950 to 2017 in which the investment glide path had a lower ROI than a safe Level 0% asset allocation. From 1950 to 2017, 10 of the 600 (1.7%) 17-year periods involved a net loss. The worst performance was an 18.0% loss. In some cases, this very aggressive investment strategy underperformed the safe investment strategy that does not invest any money in stocks, with 24 of the 600 (4.0%) 17-year periods earning less. This asset allocation did not earn enough to have at least 25% of total savings from earnings in 140 of the 600 (23.3%) 17-year periods. Note that Table 2 shows that the level investment glide paths can yield a net loss when at least half of the portfolio is invested in stocks.

TABLE 2

| Asset Allocation | Min | % Negative | % < Safe (8.2%) | % Earnings <25% |
|---|---|---|---|---|
| Level 100% | −18.9% | 1.7% | 4.0% | 23.3% |
| Level 80% | −11.7% | 1.2% | 2.8% | 26.1% |
| Level 75% | −10.1% | 1.0% | 2.8% | 27.0% |
| Level 50% | −2.9% | 0.5% | 2.3% | 37.1% |
| Level 25% | 3.2% | 0.0% | 1.8% | 73.0% |
| Level 20% | 4.3% | 0.0% | 1.8% | 90.8% |
| Level 0% | 8.2% | 0.0% | 0.0% | 100.0% |

Figure 6:
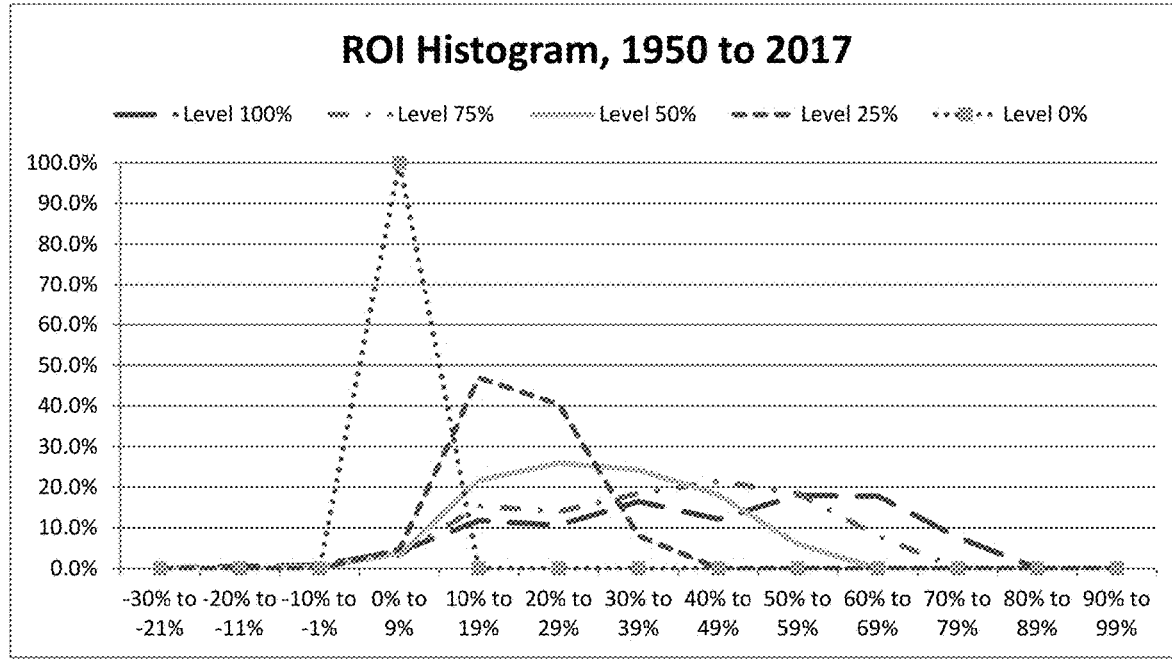
FIG. 6 shows a graph of ROI for several level investment glide paths for all 17-year periods from 1950 to 2017 based on historical investment data.

Referring to FIG. 6, a graph of ROI for the several level investment glide paths shown in Tables 1 and 2 for all 17-year periods from 1950 to 2017 is shown. As the percentage of the portfolio invested in stocks increases, the maximum potential return on investment increases, but the distribution flattens out.

Age-Based Asset Allocation

An age-based asset allocation starts off with a relatively aggressive mix of investments (such as when a child is young in a college savings fund) and gradually shifts to a relatively more conservative mix of investments as the investment event continues.

Figure 7:
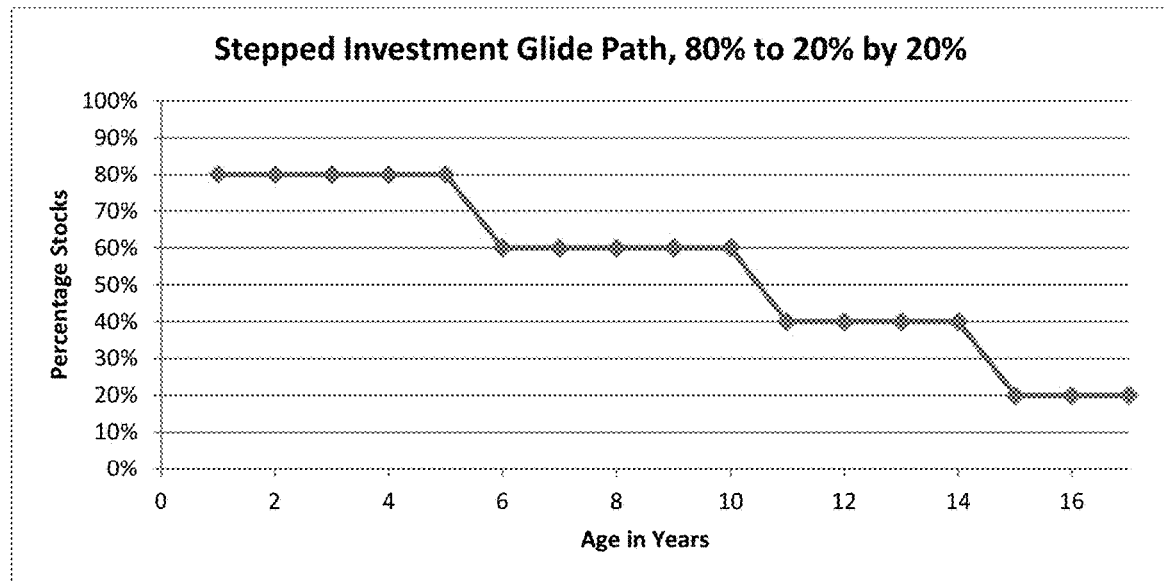
FIGS. 7-9 show graphs of non-limiting embodiments or aspects of delayed onset investment glide paths.
Figure 8:
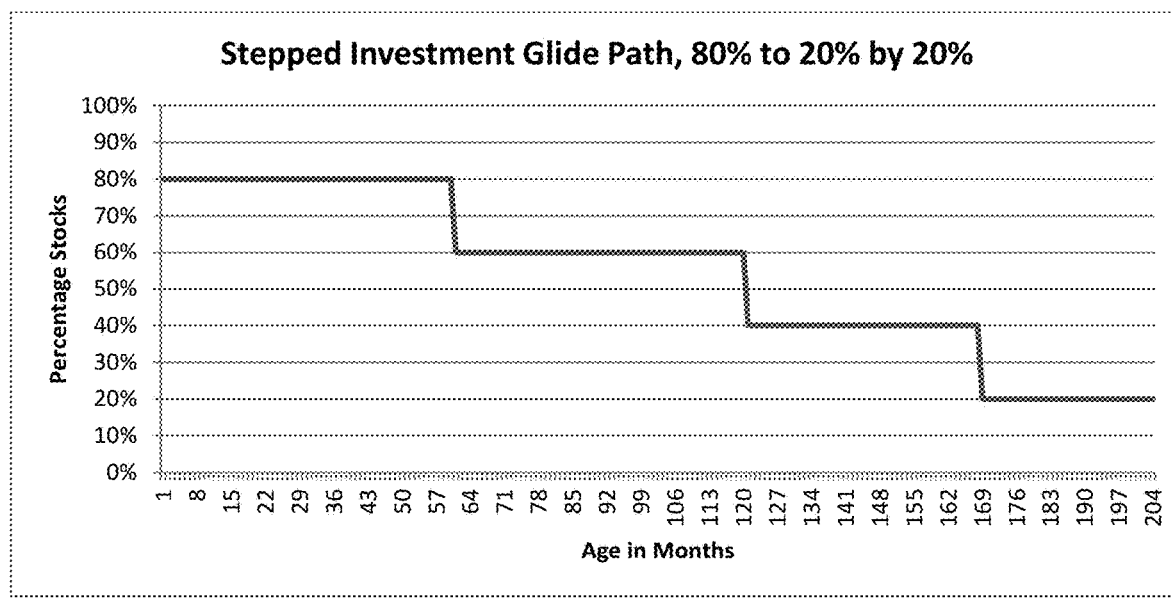
Figure 9:
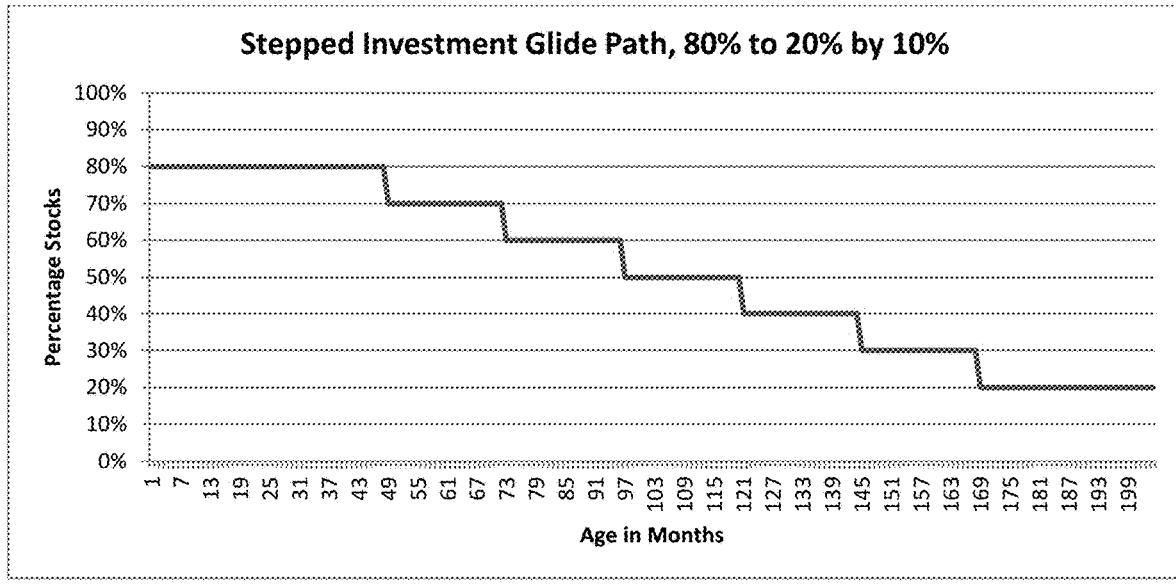

FIGS. 7-9 show graphs of percentage of stocks in an investment portfolio over time for several non-limiting examples of stepped age-based asset allocation investment glide paths. As used herein, an investment glide path is "stepped" if it includes a plurality of reallocation events between the start and the end of the investment event, such that a plurality of sections of the investment glide path that have a different asset allocation are included. As used herein, a "linear" investment glide path is a specific type of stepped investment glide path that includes a plurality of reallocation events equally spaced apart (save any delayed onset or embedded fixed sections as described hereinafter). For example, a linear investment glide path without any delayed onset or embedded fixed sections that has a duration of 17 years may have a reallocation event occurring monthly or yearly during the entire 17-year period. A delayed onset investment glide path or delay embedded investment glide path may include a linear section a portion of the investment glide path includes a plurality of equally spaced apart reallocation events.

Table 3 shows the ROI for several age-based asset allocation investment glide paths, including those shown in FIGS. 7-9. Increasing the initial or final percentage stocks in the asset allocation increases the average earnings and the percentage of total savings that comes from earnings, as does sustaining the initial percentage for a longer period of time.

TABLE 3

| Asset Allocation | Min | Max | Average | Standard Deviation | Equivalent Fixed Annual ROI | Average Earnings |
|---|---|---|---|---|---|---|
| Linear 80% to 20% | 11.1% | 44.3% | 26.5% | 9.6% | 3.4% | $19,642 |
| Linear 80% to 30% | 8.4% | 49.8% | 28.9% | 10.9% | 3.8% | $22,487 |
| Linear 100% to 20% | 11.3% | 48.5% | 29.1% | 11.0% | 3.8% | $22,795 |
| Linear 100% to 30% | 10.9% | 53.6% | 31.4% | 12.1% | 4.1% | $25,790 |
| Linear 75% to 25% | 9.5% | 46.1% | 27.1% | 9.9% | 3.5% | $20,275 |
| Stepped 80% to 20% by 20% | 6.7% | 46.5% | 27.6% | 10.6% | 3.6% | $21,022 |
| Stepped 80% to 20% by 10% | 10.2% | 44.2% | 26.6% | 9.7% | 3.4% | $19,757 |
| Stepped 75% to 0% by 25% | 3.6% | 36.2% | 22.0% | 8.7% | 2.8% | $15,156 |
| Stepped 100% to 25% by 25% | 5.9% | 53.6% | 31.5% | 12.7% | 4.1% | $26,179 |

Table 4 shows the risk associated with these age-based asset allocation investment glide paths. The risk does not appear to vary much, except for the stepped 75% to 0% by 25% investment glide path.

TABLE 4

| Asset Allocation | Min | % Negative | % < Safe (8.2%) | % Earnings <25% |
|---|---|---|---|---|
| Linear 80% to 20% | 11.1% | 0.0% | 0.0% | 48.1% |
| Linear 80% to 30% | 8.4% | 0.0% | 0.0% | 44.9% |
| Linear 100% to 20% | 11.3% | 0.0% | 0.0% | 41.6% |
| Linear 100% to 30% | 10.9% | 0.0% | 0.0% | 39.6% |
| Linear 75% to 25% | 9.5% | 0.0% | 0.0% | 47.8% |
| Stepped 80% to 20% by 20% | 6.7% | 0.0% | 0.8% | 44.1% |
| Stepped 80% to 20% by 10% | 10.2% | 0.0% | 0.0% | 46.6% |
| Stepped 75% to 0% by 25% | 3.6% | 0.0% | 5.7% | 58.1% |
| Stepped 100% to 25% by 25% | 5.9% | 0.0% | 1.5% | 38.4% |

Figure 10:
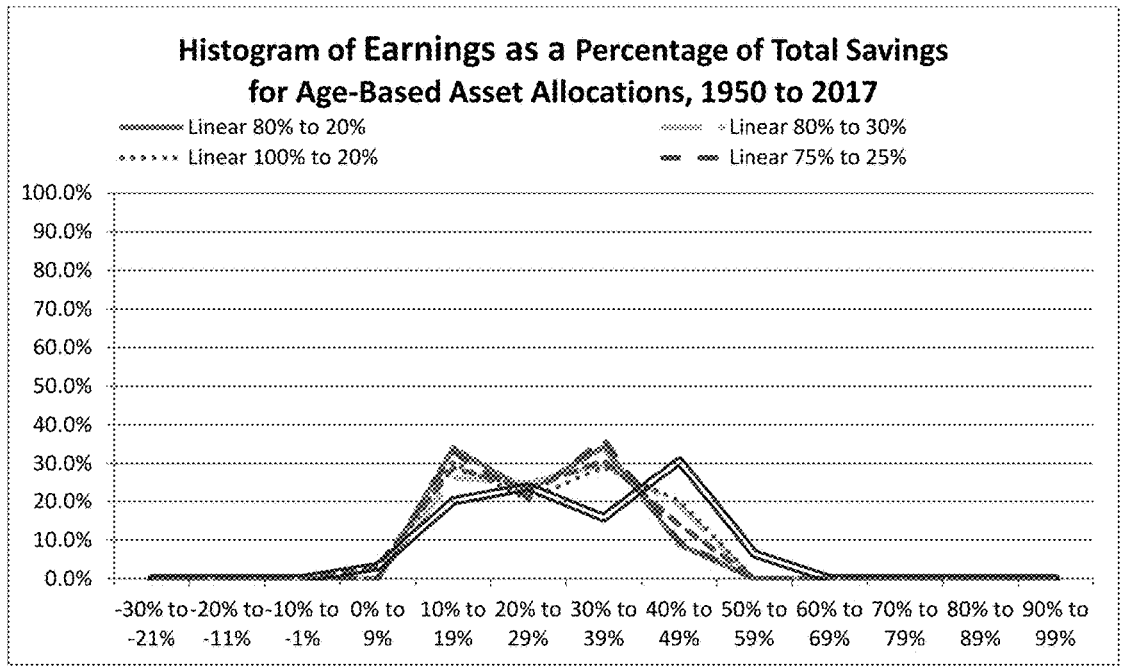
FIG. 10 shows a graph of earnings as a percentage of total savings for several age-based glide paths for all 17-year periods from 1950 to 2017 based on historical investment data.

FIG. 10 shows a graph of earnings as a percentage of total savings for these age-based investment glide paths for all 17-year periods from 1950 to 2017. The distribution of these age-based investment glide paths are similar, except that the stepped 100% to 25% by 25% investment glide path is shifted toward higher percentage earnings, albeit also with a slight increase in the investment glide paths at the low percentage earnings end of the distribution. Besides the better performance of stepped glide paths over linear glide paths, glide paths that begin at 100% also seem to perform better without significantly affecting risk.

The stepped investment glide paths seem to perform better because they sustain an initial high percentage of stocks for longer than the linear investment glide paths. The stepped investment glide paths maintain an aggressive investment posture for the first five years, instead of just one year. The linear investment glide paths move away from investments in stocks too soon.

Delayed Onset of Age-Based Asset Allocation

Delaying the start of a shift from the initial percentage of stocks by up to 10 years can increase the equivalent fixed annual ROI by as much as a percentage point without appreciably increasing the risk. This can add thousands of dollars to the investment returns.

Figure 11:
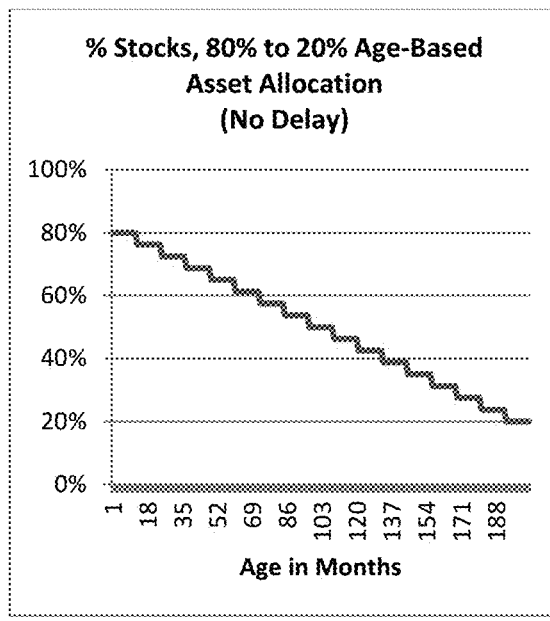
FIG. 11 shows a graph of an investment glide path for a linear 80% to 20% age-based asset allocation with a delayed onset of 0 years.
Figure 12:
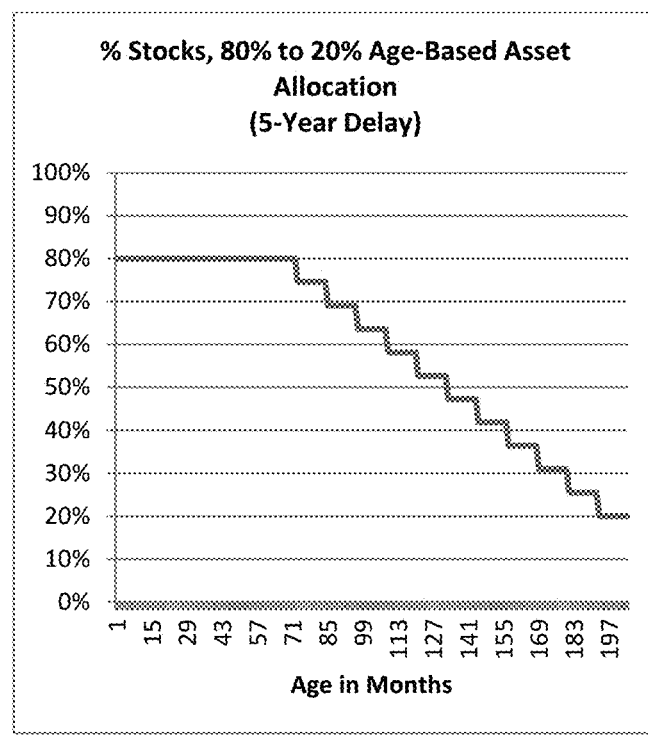
FIG. 12 shows a graph of shows a graph of an investment glide path for a linear 80% to 20% age-based asset allocation with a delayed onset of 5 years.
Figure 13:
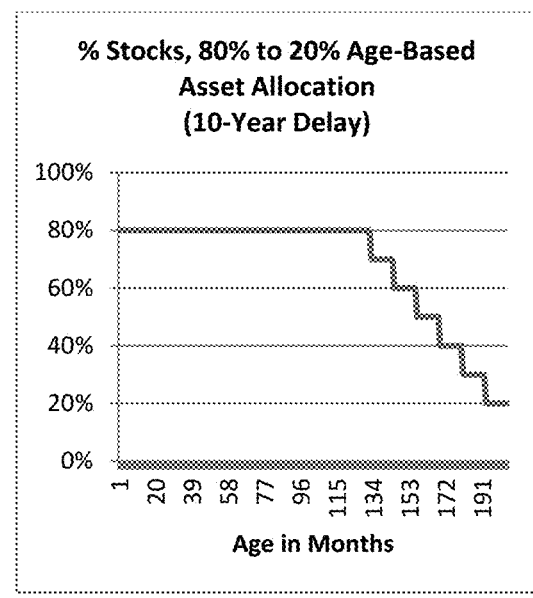
FIG. 13 shows a graph of shows a graph of an investment glide path for a linear 80% to 20% age-based asset allocation with a delayed onset of 10 years.

FIGS. 11-13 show graphs of percentage of stocks in an investment portfolio over time for several non-limiting examples of linear age-based asset allocation. FIG. 11 shows a graph of an investment glide path for a linear 80% to 20% age-based asset allocation with a delayed onset of 0 years. FIG. 12 shows a graph of an investment glide path for a linear 80% to 20% age-based asset allocation with a delayed onset of 5 years. FIG. 13 shows a graph of an investment glide path for a linear 80% to 20% age-based asset allocation with a delayed onset of 10 years.

Table 5 below shows the impact on investment performance of a delayed onset of the shift to a more conservative investment allocation for several investment glide paths at a delayed onset of no delay, 5-year delay, and 10-year delay.

TABLE 5

| Asset Allocation | Delayed Onset | Min | Max | Average | Standard Deviation | Equivalent Fixed Annual ROI | Average Earnings |
|---|---|---|---|---|---|---|---|
| Linear 80% to 20% | No Delay | 11.1% | 44.3% | 26.5% | 9.6% | 3.4% | $19,642 |
| Linear 80% to 20% | 5 years | 10.9% | 49.0% | 29.5% | 11.4% | 3.9% | $23,302 |
| Linear 80% to 20% | 10 years | 8.9% | 55.9% | 32.8% | 14.0% | 4.4% | $28,438 |
| Linear 80% to 30% | No Delay | 8.4% | 49.8% | 28.9% | 10.9% | 3.8% | $22,487 |
| Linear 80% to 30% | 5 years | 10.8% | 55.3% | 31.2% | 12.2% | 4.1% | $25,662 |
| Linear 80% to 30% | 10 years | 9.5% | 58.4% | 33.9% | 14.3% | 4.5% | $30,057 |
| Linear 100% to 20% | No Delay | 11.3% | 48.5% | 29.1% | 11.0% | 3.8% | $22,795 |
| Linear 100% to 20% | 5 years | 10.8% | 54.2% | 32.8% | 13.4% | 4.3% | $28,045 |
| Linear 100% to 20% | 10 years | 7.5% | 62.6% | 36.6% | 16.5% | 5.0% | $35,522 |
| Linear 100% to 30% | No Delay | 10.9% | 53.6% | 31.4% | 12.1% | 4.1% | $25,790 |
| Linear 100% to 30% | 5 years | 11.0% | 58.1% | 34.4% | 14.0% | 4.6% | $30,569 |
| Linear 100% to 30% | 10 years | 8.4% | 64.6% | 37.6% | 16.7% | 5.1% | $37,284 |

TABLE 5-continued

| Asset Allocation | Delayed Onset | Min | Max | Average | Standard Deviation | Equivalent Fixed Annual ROI | Average Earnings |
|---|---|---|---|---|---|---|---|
| Linear 75% to 25% | No Delay | 9.5% | 46.1% | 27.1% | 9.9% | 3.5% | $20,275 |
| Linear 75% to 25% | 5 years | 11.0% | 49.9% | 29.5% | 11.4% | 3.8% | $23,330 |
| Linear 75% to 25% | 10 years | 9.5% | 55.4% | 32.3% | 13.5% | 4.3% | $27,572 |

As Table 5 demonstrates, the investment performance of linear 80% to 20% investment glide path improves as the delayed onset increases. A 5-year delayed onset increases the equivalent fixed annual interest rate by 0.5% and the ROI by $3,660. A 10-year delayed onset increases the equivalent fixed annual interest rate by 1.0% and the ROI by $8,796. The linear 80% to 20% investment glide path with a 5-year delayed onset has superior performance to the linear 80% to 20% by 20% investment glide path, with a 0.3% higher equivalent fixed annual interest rate and a $2,280 higher return.

Table 6 shows the change in the risks associated with the delayed onset. It demonstrates that the change in risk is negligible. The risks associated with a 5-year delay in the linear 80% to 20% investment glide path are also lower than for a linear 80% to 20% by 20% investment glide path.

TABLE 6

| Asset Allocation | Delayed Onset | Min | % Negative | % < Safe (8.2%) | % Earnings <25% |
|---|---|---|---|---|---|
| Linear 80% to 20% | No Delay | 11.1% | 0.0% | 0.0% | 48.1% |
| Linear 80% to 20% | 5 years | 10.9% | 0.0% | 0.0% | 41.8% |
| Linear 80% to 20% | 10 years | 8.9% | 0.0% | 0.0% | 37.3% |
| Linear 80% to 30% | No Delay | 8.4% | 0.0% | 0.0% | 44.9% |
| Linear 80% to 30% | 5 years | 10.8% | 0.0% | 0.0% | 39.8% |
| Linear 80% to 30% | 10 years | 9.5% | 0.0% | 0.0% | 36.4% |
| Linear 100% to 20% | No Delay | 11.3% | 0.0% | 0.0% | 41.6% |
| Linear 100% to 20% | 5 years | 10.8% | 0.0% | 0.0% | 36.4% |
| Linear 100% to 20% | 10 years | 7.5% | 0.0% | 0.5% | 32.3% |
| Linear 100% to 30% | No Delay | 10.9% | 0.0% | 0.0% | 39.6% |
| Linear 100% to 30% | 5 years | 11.0% | 0.0% | 0.0% | 33.9% |
| Linear 100% to 30% | 10 years | 8.4% | 0.0% | 0.0% | 31.6% |
| Linear 75% to 25% | No Delay | 9.5% | 0.0% | 0.0% | 47.8% |
| Linear 75% to 25% | 5 years | 11.0% | 0.0% | 0.0% | 42.6% |
| Linear 75% to 25% | 10 years | 9.5% | 0.0% | 0 0% | 38.1% |

Figure 14:
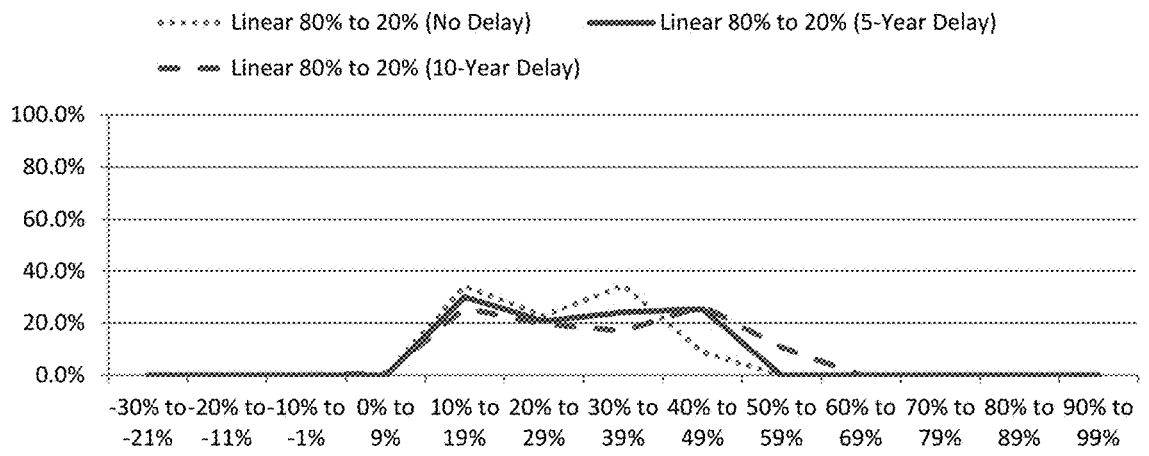
FIG. 14 shows a graph of earnings as a percentage of total savings for the investment glide paths shown in FIGS. 11-13 for all 17-year periods from 1950 to 2017 based on historical investment data.

FIG. 14 shows the impact of a no delay, 5-year delay, and 10-year delayed onset on the distribution of investment glide paths by the percentage of total savings attributable to earnings of a linear 80% to 20% investment glide path for all 17-year periods from 1950 to 2017. It demonstrates that a 5-year delay performs better than no delay, and a 10-year delay performs better than a 5-year delay.

Figure 15:
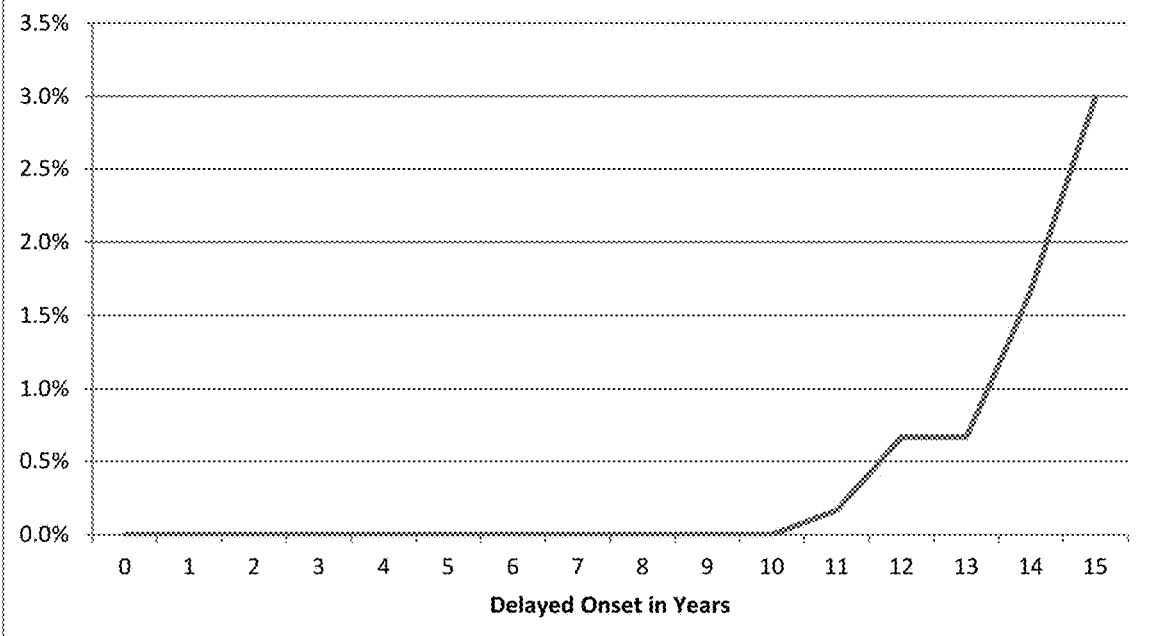
FIG. 15 shows a graph of percentage of 17-year periods with a ROI less than a safe level of 0% asset allocation for several investment glide paths with different delayed onsets.

FIG. 15 shows the impact of the delayed onset of a linear 80% to 20% investment glide path on the percentage of 17-year periods with a ROI less than that of the safe Level 0% asset allocation. As the chart demonstrates, the risk starts increasing with a delayed onset of 11 or more years. Graphs of the impact of delayed onset of other investment glide paths are similar, with performance on all 17-year periods exceeding that of a safe Level 0% investment glide path up until 9-11 years of delayed onset.

Extended Delay Embedded Investment Glide Path

The execution logic may be associated with at least one extended delay embedded investment glide path. As used herein, an "extended delay embedded investment glide path" refers to an investment glide path that includes a reallocation glide path comprising a plurality of reallocation events, wherein the reallocation glide path comprises an extended fixed section between a first allocation event and a last reallocation event, the extended fixed section having a duration longer than an average duration of remaining fixed sections. The extended delay embedded investment glide path may include a plurality of extended fixed sections between a first allocation event and a last reallocation event the extended fixed sections each having a duration longer than an average duration of remaining (non-extended) fixed sections.

Figure 16:
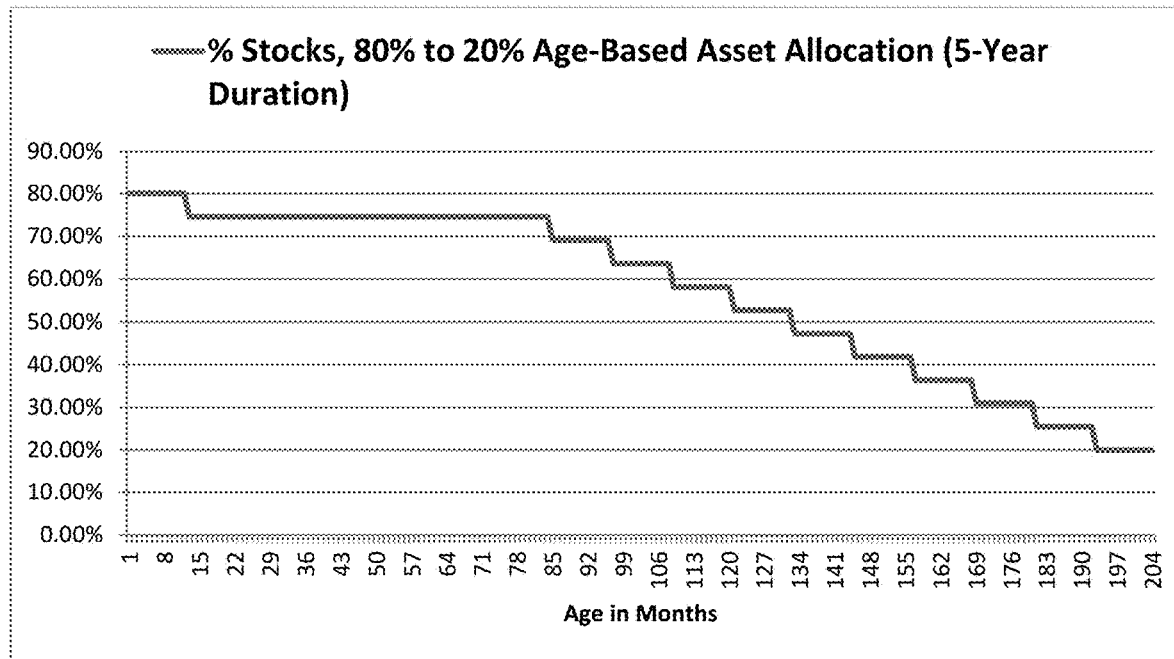
FIG. 16 shows graph of an extended delay embedded investment glide path with a 5-year embedded extended fixed section.
Figure 17:
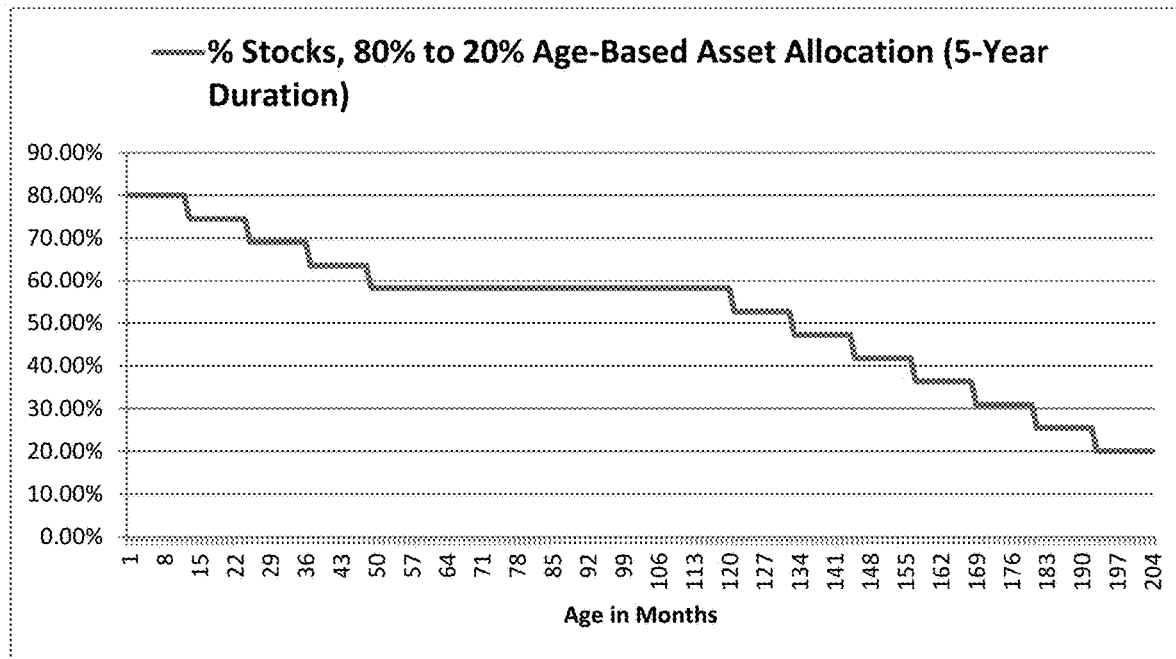
FIG. 17 shows graph of an extended delay embedded investment glide path with a 5-year embedded extended fixed section.

FIGS. 16 and 17 show graphs of two non-limiting embodiments of extended delay embedded investment glide paths. In both FIGS. 16 and 17, the extended fixed section has a duration of 5 years, but it will be appreciated that the extended fixed section may be any of the above-described durations of the extended fixed section of the delayed onset investment glide path, such as at least 1 year, at least 2 years, at least 3 years, at least 4 years, at least 5 years at least 6 years at least 7 years, at least 8 years, at least 9 years, at least 10 years, or at least 11 years. The extended fixed section may be included in the investment glide path between the first reallocation event and the last reallocation event. For example, FIG. 16 shows the extended fixed section beginning at the first reallocation event and ending at the second reallocation event. For example, FIG. 17 shows the extended fixed section beginning at the fourth reallocation event and ending at the fifth reallocation event. It will be appreciated that the extended fixed section may fall anywhere between the first and the last reallocation event, however. In FIGS. 16 and 17, the extended fixed section has a duration of 5 years, whereas the average of the remaining fixed sections is 1 year, thus making the 5-year section between the first and last reallocation event an extended fixed section.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for developing, evaluating, validating, and executing an investment glide path for an investment event having an expected first duration, comprising:
   receiving, with at least one processor, historical investment data associated with a plurality of consecutive time periods, wherein the plurality of consecutive time periods sum to a second duration at least as long as the first duration;
   generating, with the at least one processor, a plurality of delayed onset investment glide paths associated with the investment event and having a first duration, the plurality of delayed onset investment glide paths each comprising: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration;
   simulating, with the at least one processor, projected returns over the first duration for each of the plurality of delayed onset investment glide paths using the historical investment data associated with a plurality of the consecutive time periods summing to a length equal to the first duration;
   based on the simulating, determining, with the at least one processor, a selected delayed onset investment glide path from the plurality of delayed onset investment glide paths;
   generating, with at least one processor, execution logic associated with the selected delayed onset investment glide path by generating a data file and/or program instructions configured to execute the selected delayed onset investment glide path; and
   automatically executing, with the at least one processor, the selected delayed onset investment glide path by executing the execution logic, wherein executing the execution logic comprises:
      automatically allocating, with a trading processor, an initial asset allocation specified by the execution logic by automatically executing at least one first trade; and
      at a predetermined time corresponding to a reallocation event specified by the execution logic, automatically reallocating, with the trading processor, the initial asset allocation to a second asset allocation by automatically executing at least one second trade.

2. The method of claim 1, wherein the second duration is longer than the first duration, wherein simulating the projected returns for each of the plurality of delayed onset investment glide paths comprises:
   determining, with the at least one processor, a plurality of different simulation periods, each simulation period having a plurality of the consecutive time periods summing to a length equal to the first duration; and
   for each of the simulation periods, simulating, with the at least one processor, projected returns for each of the plurality of delayed onset investment glide paths using the historical investment data associated with the respective simulation period.

3. The method of claim 1, wherein the reallocation glide path comprises a compression rate defined by a duration between reallocation events associated with the reallocation glide path, wherein the method further comprises:
   generating, with the at least one processor, a plurality of compression rates associated with the reallocation glide path;
   simulating, with the at least one processor, projected returns over the reallocation glide path for each of the plurality of compression rates associated with the reallocation glide path based on historical investment data; and
   based on the simulated projected returns, configuring, with at the least one processor, execution logic representing at least one of the plurality of compression rates associated with the reallocation glide path.

4. The method of claim 1, wherein the investment event comprises a K-12 savings account, a college savings account, a retirement savings account, or a down payment savings account.

5. The method of claim 3, wherein the compression rate comprises between one reallocation event per month and one reallocation event per year.

6. The method of claim 1, wherein the extended fixed allocation glide path comprises at least 1 year.

7. The method of claim 3, wherein the reallocation event comprises initiating a percentage change in asset class allocation in an account associated with the investment event.

8. The method of claim 1, further comprising:
   determining a risk associated with each of the plurality of delayed onset investment glide paths based on the simulated projected returns.

9. The method of claim 8, wherein determining the risk associated with each of the plurality of delayed onset investment glide paths comprises analyzing a percentage of the simulated projected returns falling below a threshold, wherein the threshold comprises a return on investment for a baseline glide path.

10. The method of claim 1, wherein an initial asset allocation associated with the extended fixed allocation glide path comprises at least 75% high-risk investments.

11. The method of claim 1, wherein the at least one delayed onset investment glide path comprises a non-linear portion.

12. A system for developing, evaluating, validating, and executing an investment glide path for an investment event having an expected first duration, comprising at least one processor programmed or configured to:
   generate execution logic associated with at least one delayed onset investment glide path associated with the investment event and having the first duration, the at least one delayed onset investment glide path comprising: (1) an extended fixed allocation glide path, the extended fixed allocation glide path at a beginning of the delayed onset investment glide path, and (2) a reallocation glide path, the reallocation glide path immediately following the extended fixed allocation glide path and continuing for a remainder of the first duration; and
   automatically execute the at least one delayed onset investment glide path according to the execution logic, wherein initiating execution of the at least one delayed onset investment glide path comprises:
      automatically allocating, with a trading processor, an initial asset allocation specified by the execution logic by automatically executing at least one first trade; and at a predetermined time corresponding to a reallocation event specified by the execution logic, automatically reallocating, with the trading processor, the initial asset allocation to a second asset allocation by automatically executing at least one second trade.

13. The system of claim 12, wherein the at least one processor is further programmed or configured to:
receive historical investment data associated with a plurality of consecutive time periods, wherein the plurality of consecutive time periods sum to a second duration at least as long as the first duration;
generate a plurality of delayed onset investment glide paths associated with the investment event and having the first duration; and
simulate projected returns over the first duration for each of the plurality of delayed onset investment glide paths based on the historical investment data associated with a plurality of the consecutive time periods summing to a length equal to the first duration.

14. The system of claim 12, wherein the investment event comprises a K-12 savings account, a college savings account, a retirement savings account, or a down payment savings account.

15. The system of claim 13, wherein the second duration is longer than the first duration, wherein simulating the projected returns for each of the plurality of delayed onset investment glide paths comprises the at least one processor:
determining a plurality of different simulation periods, each simulation period having a plurality of the consecutive time periods summing to a length equal to the first duration; and
for each of the simulation periods, simulating projected returns for each of the plurality of delayed onset investment glide paths using the historical investment data associated with the respective simulation period.

16. The system of claim 12, wherein the reallocation glide path comprises a compression rate defined by a duration between reallocation events associated with the reallocation glide path, wherein the at least one processor is further programmed or configured to:
generate a plurality of compression rates associated with the reallocation glide path;
simulate projected returns over the reallocation glide path for each of the plurality of compression rates associated with the reallocation glide path based on historical investment data; and
based on the simulated projected returns, generate execution logic representing at least one of the plurality of compression rates associated with the reallocation glide path.

17. The system of claim 12, wherein the extended fixed allocation glide path comprises at least 1 year.

18. A method for developing, evaluating, validating, and executing an investment glide path for an investment event having an expected first duration, comprising:
receiving, with the at least one processor, historical investment data associated with a plurality of consecutive time periods, wherein the plurality of consecutive time periods sum to a second duration at least as long as the first duration;
generating, with the at least one processor, a plurality of extended delay embedded investment glide paths associated with the investment event and having the first duration, the plurality of extended delay embedded investment glide paths each comprising: a reallocation glide path comprising a plurality of reallocation events, wherein the reallocation glide path comprises an extended fixed section between a first allocation event and a last reallocation event, the extended fixed section having a duration longer than an average duration of remaining fixed sections;
simulating, with the at least one processor, projected returns over the first duration for each of the plurality of extended delay embedded investment glide paths using the historical investment data associated with a plurality of the consecutive time periods summing to a length equal to the first duration;
based on the simulating, determining, with the at least one processor, a selected extended delay embedded investment glide path from the plurality of extended delay embedded investment glide paths;
generating, with at least one processor, execution logic associated with the selected extended delay embedded investment glide path by generating a data file and/or program instructions configured to execute the selected extended delay embedded investment glide path; and
automatically executing, with the at least one processor, the selected extended delay embedded investment glide path by executing the execution logic, wherein executing the execution logic comprises:
automatically allocating, with a trading processor, an initial asset allocation specified by the execution logic by automatically executing at least one first trade; and
at a predetermined time corresponding to a reallocation event specified by the execution logic, automatically reallocating, with the trading processor, the initial asset allocation to a second asset allocation by automatically executing at least one second trade.

* * * * *